Sept. 4, 1973 R. F. CRUTHERS 3,756,887

METHOD OF MAKING MICROFUSES ON A THIN FILM CIRCUITRY PANEL

Filed July 29, 1971

United States Patent Office
3,756,887
Patented Sept. 4, 1973

3,756,887

METHOD OF MAKING MICROFUSES ON A THIN FILM CIRCUITRY PANEL

Ronald F. Cruthers, Indianapolis, Ind., assignor to the United States of America as represented by the Secretary of the Navy Filed July 29, 1971, Ser. No. 167,312
Int. Cl. B44c *1/22*; H05k *1/00*
U.S. Cl. 156—3 4 Claims

ABSTRACT OF THE DISCLOSURE

A method of making microfuses on a thin film circuitry panel comprising depositing a layer of chromium on a substrate and then etching said chromium to provide a plurality of rectangular areas each having a notch therein. A layer of conductive metal is provided at each end of each rectangular area to serve as conductors.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a method of making microfuses which have small size, low weight, high mechanical strength and which can be blown at a very low current, such as 5 milliamps. More particularly, the present invention relates to a method of depositing microfuses on glass or ceramic substrates.

There is a constant demand for smaller electrical and electronic components, particularly in the aircraft field, as weight is of extreme importance. One concept of microelectronics which offers a great reduction in size and weight of electronic units is that of integrated circuitry on ceramic substrates. Integrated circuitry includes a number of active and passive components which are fabricated by one or more of a combination of several thin film deposition techniques onto a glass or ceramic substrate. Heretofore, however, integrated circuitry has been comprised of resistors, capacitors, conductors and active devices, and microfuses have not been deposited.

A recent design utilizes a plurality of fuses which can be blown to selectively switch-in a resistance valve for a timing circuit. The present invention relates to a method for producing microfuses on an integrated circuitry panel.

SUMMARY OF THE INVENTION

The present invention relates to a method of producing microfuses on substrates. A layer of chromium is first deposited onto the substrate and then the chromium is masked and etched to produce a plurality of rectangular areas each having a notch therein. A layer of conductive metal is deposited at each end of each rectangular area to provide a conductive path to each chromium microfuse.

It is therefore a general object of the present invention to provide a method of producing a plurality of microfuses on a substrate by depositing metals thereon.

DESCRIPTION OF THE PREFERRED EMBODIMENT

Figure 1:
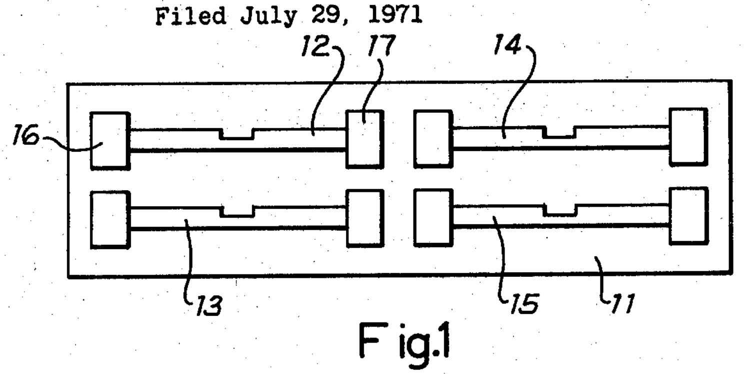
FIG. 1 is a plan view showing a plurality of microfuses on a substrate.

Referring now to the drawing, there is shown in FIG. 1, a substrate 11, which is of insulating material, such as glass or ceramic material, upon which fuses 12 through 15 are deposited. A pair of conductive pads 16 and 17 are attached to the ends of each fuze.

In FIGS. 2*a*–2*k*, there is shown the sequence of manufacturing steps used in producing fuses according to the method of the present invention. An ideal substrate should have high thermal conductivity, minimum electrical conductivity, low thermal coefficient of expansion, high mechanical strength, and low dielectric constant. Also, the surface should be flat, smooth, and homogeneous. Glass is extensively used as a substrate material for evaporated thin-film microcircuitry. Although glass has relatively low thermal conductivity, it is inexpensive and readily available. Also, glass has the desired flat, smooth surface, and has favorable electrical, chemical, and thermal expansion properties.

Ceramics are also extensively used as substrate. While the dielectric constants of ceramics are not as low as that of glass and the surfaces not as smooth as glass, in general, ceramics excel glass in heat conductivity, mechanical strength and high temperature capabilities. Alumina ($Al_2O_3$), beryllia (BeO), and barium titanate ($BaTiO_3$) are some of the ceramic materials that are presently being used as substrates for microcircuits.

Figures 2A, 2B, 2C, 2D, 2E, 2F, 2G, 2H, 2I, 2J, 2K:
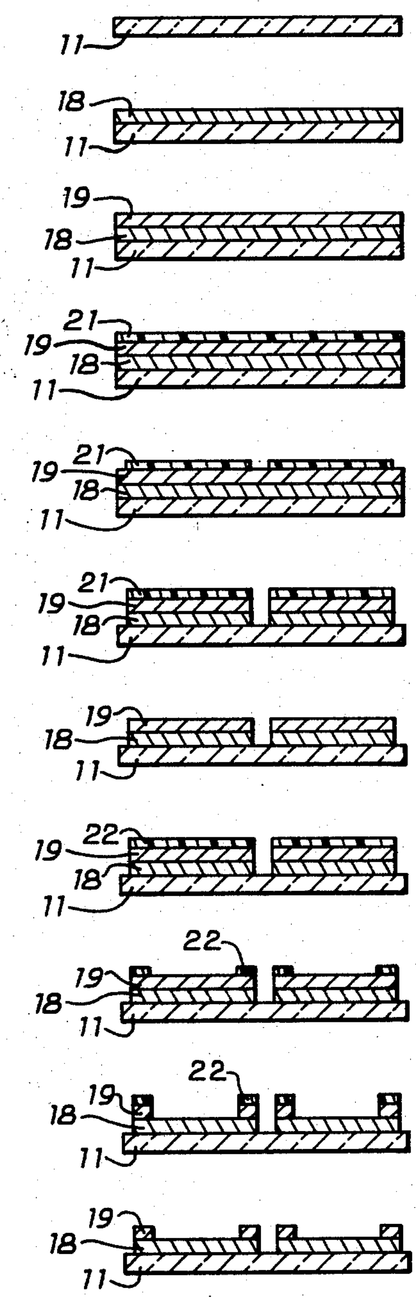
FIGS. 2(*a*) through 2 (*k*) are sectional views depicting microfuses in various stages of manufacture.

The first step of producing microfuses according to this invention is the deposition of a layer of chromium 18 onto substrate 11, as shown in FIG. 2*b*. A layer of highly electrical conductive material 19, such as gold, is then deposited over the layer of chromium 18, as shown in FIG. 2*c* and then a photosensitive coating 21 is applied over the conductive material 19. Suitable light is projected through a photomask in order to develop, or harden, the coating that covers the areas which are to remain as fuses and conductive pads. In FIG. 2*e* of the drawing, there is shown the photosensitive coating 21 which remains after the unexposed portion of the coating 21 is removed, as by rinsing in a suitable solvent.

The next step, as shown in FIG. 2*f*, is to remove, by etching, the conductive material 19 not covered by coating 21 and then, to remove, by etching, the layer of chromium not protected by coating 21. By way of example, if the layer of conductive material 19 is gold, an etching bath might be comprised of 400 g. of KI; 100 g. of $I_2$ and 400 ml. of water. The chromium etch might be a mixture of 1 part of 50 g. NaOH in 100 ml. of water to 3 parts of 100 g. K3[Fe(Cn)6] in 30 ml. of water.

The exposed coating 21 is then removed by submerging in a suitable stripper and then a new coating 22 is applied, as shown in FIG. 2*h*. Again light is passed through a photomask to expose coating 22 which covers the conductive pads and the unexposed coating 22 is removed, as shown in FIG. 2*i*. The conductive material 19 which is not covered by coating 22 is removed, by etching, as shown in FIG. 2*j*, and then the coating 22 is removed, as shown in FIG. 2*k*.

By way of example, coatings 21 and 22 might be Thin Film Resist, manufactured by the Eastman Kodak Co., Rochester, N.Y., and this resist can be stripped by using Shipley 77 Stripper, which is manufactured by the Shipley Co., Newton, Mass.

Figure 3:
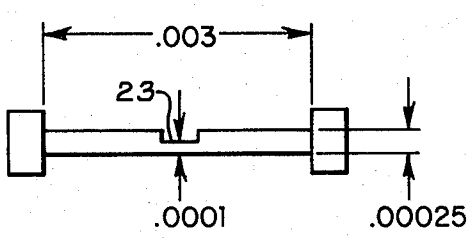
FIG. 3 is a plan view showing the relative dimensions of one microfuse.

Referring now to FIG. 3 of the drawing, it can be seen that the microfuses produced by the present invention are very small. A notch 23 is provided in each fuse and the depth of the notch is greater than one-half the width of the fuse. The dimensions shown in FIG. 3 of the drawing, permit the fuse to carry 0.15 milliamp and blow at about 7.0 milliamps.

It can thus be seen that the present invention provides an improved method of producing microfuses by depositing metal on a substrate and providing a notch in the rectangular fuse pattern.

I claim:

1. A method of making microfuses on a thin film circuitry panel comprising:

first depositing a layer of chromium on an insulating substrate, next depositing a layer of highly electrical conductive metal over said layer of chromium, next forming a plurality of notched rectangular patterns and adjacent end pads at each end of each said notched rectangular pattern by removing, by etching, a portion of said layer of electrical conductive metal and a portion of said layer of chromium, and then removing, by etching, the conductive metal above each said notched rectangular pattern to provide a plurality of notched microfuses each having a conductive pad at each end thereof.

2. A method of making microfuses as set forth in claim 1 wherein said layer of highly electrical conductive metal is gold.

3. A method of making microfuses as set forth in claim 1 wherein the depth of said notch in each rectangular section is greater than one-half the width of said rectangular section.

4. A method of making a thin film circuitry panel having a plurality of notched microfuses with conductor pads on each end thereof comprising, depositing a layer of chromium on an insulating substrate, next depositing a layer of highly electrical conductive metal over said layer of chromium, next coating said layer of highly electrical conductive metal with a layer of photosensitive material, next fixing patterns of notched microfuses with conductor pads on each end thereof on said layer of photosensitive material, next removing any photosensitive coating not fixed on said layer of photosensitive coating, next forming a plurality of notched rectangular patterns and adjacent end pads at each end of each said notched rectangular pattern by removing, by etching, a portion of said layer of electrical conductive metal and a portion of said layer of chromium, next removing the photosensitive coating on the notched rectangular patterns and adjacent end pads, next applying and fixing a coating of photosensitive material on said end pads, next removing, by etching, the conductive metal above each said notched rectangular pattern to provide a plurality of notched microfuses, and then removing said coating of photosensitive material on said end pads.

References Cited

UNITED STATES PATENTS

| | | | |
|---|---|---|---|
| 1,614,562 | 1/1927 | Laise | 156—18 |
| 3,367,806 | 2/1968 | Callis | 156—17 |
| 3,423,205 | 1/1969 | Skaggs et al. | 96—36.2 |
| 3,529,350 | 9/1970 | Rairden | 29—626 |

OTHER REFERENCES

Flitsch: Etch For Removing Gold, I.B.M. Disclosure Bulletin, vol. 10, No. 4, September 1967, p. 355.

JACOB H. STEINBERG, Primary Examiner

U.S. Cl. X.R.

156—11